United States Patent [19]

Harrington

[11] Patent Number: 4,896,820
[45] Date of Patent: Jan. 30, 1990

[54] HOLDER FOR TACOS OR THE LIKE

[75] Inventor: Max G. Harrington, Fairoaks, Calif.

[73] Assignee: Idea Resources Corporation, Woodland, Calif.

[21] Appl. No.: 324,450

[22] Filed: Mar. 16, 1989

[51] Int. Cl.⁴ .......................... B65D 5/00; A47J 43/00
[52] U.S. Cl. ........................................ 229/100; 211/73; 248/174; 426/124; 426/128; 229/117.03; 229/120.02; 229/DIG. 13
[58] Field of Search ................... 248/152, 174, 459; 211/73; 229/DIG. 13, 16 R; 426/119, 124, 128, 132

[56] References Cited

U.S. PATENT DOCUMENTS

| | | | |
|---|---|---|---|
| 1,692,748 | 11/1928 | Locke, Jr. | 248/174 |
| 1,752,655 | 4/1930 | Scherotto | 211/73 |
| 1,852,471 | 4/1932 | Nelson | 248/174 |
| 2,125,784 | 8/1938 | Higgins | 248/174 |
| 2,232,466 | 2/1941 | McKeown | 248/459 |
| 2,708,085 | 5/1955 | Bonaccorsi | 248/174 |
| 3,013,668 | 12/1961 | Mennen | 248/459 |
| 4,589,619 | 5/1986 | Forbes, Jr. | 229/DIG. 13 |
| 4,603,825 | 8/1986 | Kotliar | 229/DIG. 13 |
| 4,746,010 | 5/1988 | Fournier | 229/DIG. 13 |

*Primary Examiner*—Gary Elkins
*Attorney, Agent, or Firm*—Melvin R. Stidham

[57] ABSTRACT

A taco holder is formed from a blank cut from a sheet of paperboard material. The blank has a first pair of parallel fold lines across the mid-portion and a second pair of fold lines near the side edges so that they can be folded up to form feet. Perforated polygons extending across the parallel lines can be folded to lock the taco holder in position to receive tacos, which are supported on the side panels while being made up and while being heated, as in a microwave oven.

5 Claims, 1 Drawing Sheet 4,896,820

HOLDER FOR TACOS OR THE LIKE

BACKGROUND OF THE INVENTION

Taco holders that are presently being used to receive a taco shell while it is being filled are generally made of metal and are purchased separate and apart from the taco shells themselves. Such holders are generally not suitable for use in an oven and if they are made even partially of metal, they cannot be used in microwave ovens. Containers in which taco shells are packed are not adapted for use in the preparation and/or cooking of tacos.

OBJECTS OF THE INVENTION

It is an object of this invention to provide a taco holder that can be made inexpensively and easily from a material that can be used in a microwave oven.

It is a further object of this invention to provide a taco holder that can be used in the packaging of taco shells.

It is a further object of this invention to provide a packing item for a taco shell that can easily be modified for use as a holder in making up and cooking the taco.

Other objects and advantages of this invention will become apparent from the description to follow, particularly when read in conjunction with the accompanying drawing.

SUMMARY OF THE INVENTION

In carrying out this invention, I provide a packing item for a taco shell. The packaging item is of generally octagonal configuration with opposing side edges and a pair of parallel fold or score lines extending across the mid-section parallel to opposing side edges. In packing, the blank can be folded down along both of the parallel score lines to form a sort of pocket that can encompass a taco shell or several nested taco shells. Additional score lines are provided parallel to each of the opposing side edges so that the side edge portions can be folded up to form feet for the side panels. Continuous score lines form polygons that extend across the two side panels so that, when the area within the score lines are folded across the holder, they engage the opposite side and lock the taco holder in position and form pockets to receive tacos while they are being made up. The cardboard holders cna be used in a microwave oven to heat the tacos.

DETAILED DESCRIPTION OF A PREFERRED EMBODIMENT

Figure 1:
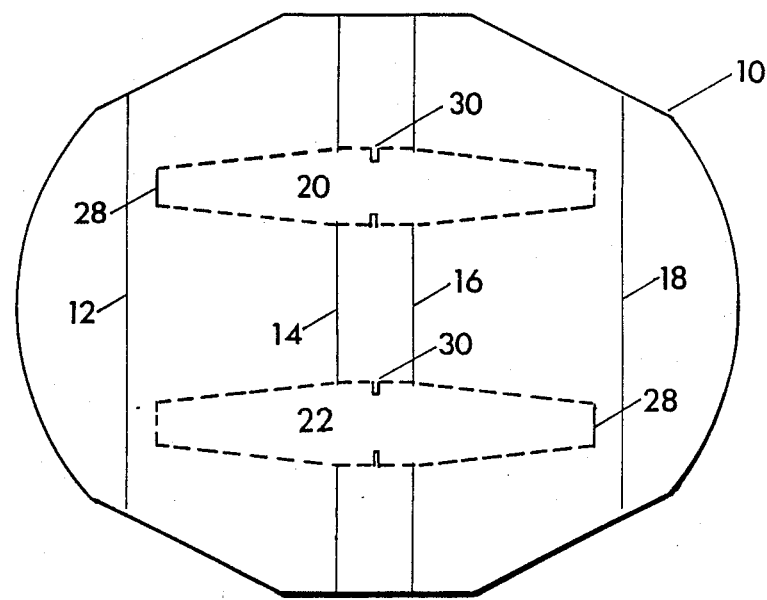
FIG. 1 is a top plan view of the taco holder of this invention as used as a backing panel for a package of tacos.
Figures 3, 4:
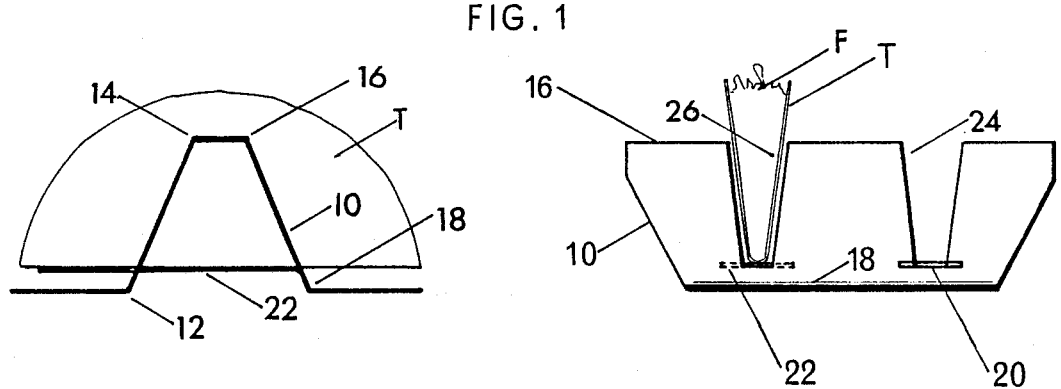
FIG. 3 is a side view of the taco holder in use.
FIG. 4 is an end view of the taco holder.

Referring now to the drawing with greater particularity, the taco holder 10 of this invention may be supplied flat as a backup panel for a package of flat tortillas or the like, and may be of general octagonal or oval configuration as shown. The flat holder has scored fold lines 12, 14, 16 and 18 and as an alternative it may be folded along the intermediate score lines 14 and 16 to form a wallet-like folder for several nested tacos. Extending lengthwise of the blank 10 are perforated punch out sections 20 and 22 which, when folded down at fold line 28, form suitable pockets or receptacles 24 and 26 (FIGS. 2 and 4) adapted to receive a pair of tacos T with filling F. Notches 30 on the side of the punch out sections engage sides of pockets 24 and 26 to lock the holder in position. That is, section 20 is folded down at the left and its notch 30 locks the opposite side of the folded holder, and section 22 folds down at the right to interlock with the panel on the left.

Figure 2:
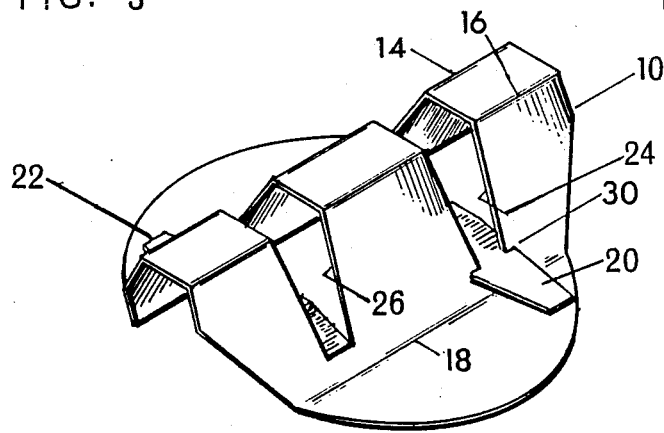
FIG. 2 is a view in perspective of the taco holder with perforated portions folded and locked in position and the holder folded for use.

When packing and shipping tacos, the blank 10 is used as a backup panel or filler for the package. Then, when the tacos are to be prepared, the filler 10 is removed and the punchout sections 20 and 22 are folded down to lock the taco holder in position. The blank 10 can be folded along the score lines 12, 14, 16 and 18 to form a type of A-frame stand, as shown in FIG. 2. Preferably, the taco holder 10 is made of cardboard without any metal foil. In that form, the taco holder with tacos T in place may be inserted into a microwave oven and heated as desired. After heating, the tacos may be served and the taco holder 10 may be used over for heating additional tacos.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A holder for tacos or the like comprising:
   a blank formed from a sheet of paperboard material;
   said blank having end edges and a pair of opposing side edges;
   a first pair of parallel fold lines across said blank parallel to said side edges and near the mid-portion of said blank to enable side portions of said blank to be folded toward each other to encompass a taco or the like;
   a first continuous line forming a polygon extending across said first pair of parallel fold lines and into said side portions;
   one line of said first polygon parallel to said first pair of fold lines being a fold line and the other lines being perforated so that the area within said first polygon is partially removable to form a pocket when said side portions are folded toward each other, adapted to receive a taco or the like; and
   a second pair of parallel fold lines, each of said second pair of fold lines being along and parallel to one of said side edges to enable side edge portions to be folded away from each other to form generally horizontal bases for said folded form.

2. The holder defined by claim 1 including;
   interengaging means on said first polygon and one of said side portions to hold said side portions in folded positions.

3. The holder defined by claim 1 including:
   a second continuous perforated line forming a second polygon extending across said first pair of parallel fold lines and into said side portions;
   one line of said second polygon parallel to said first pair of fold lines being a fold line and the other lines being perforated so that the area of said blank within said second polygon is partially removable to form a slot for receipt of a taco or the like when said side portions are folded toward each other.

4. The holder defined by claim 3 including:
interengaging means on said second polygon and the other of said side portions to hold said portions in folded positions.

5. The holder defined by claim 1 wherein:
the ends of said first polygon are generally parallel to and along said second pair of parallel fold lines, the sides of said first polygon are generally parallel at the mid-portions thereof and converge to meet the ends of said end lines.

* * * * *